United States Patent
Tanaka et al.

(10) Patent No.: US 10,124,508 B2
(45) Date of Patent: Nov. 13, 2018

(54) METHOD FOR PRODUCING PLUGGED HONEYCOMB STRUCTURE

(71) Applicant: NGK INSULATORS, LTD., Nagoya (JP)

(72) Inventors: Kensuke Tanaka, Nagoya (JP); Yasumasa Fujioka, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 247 days.

(21) Appl. No.: 15/264,843

(22) Filed: Sep. 14, 2016

(65) Prior Publication Data
US 2017/0001333 A1    Jan. 5, 2017

Related U.S. Application Data

(63) Continuation of application No. PCT/JP2015/053015, filed on Feb. 3, 2015.

(30) Foreign Application Priority Data

Mar. 27, 2014  (JP) .................. 2014-066185

(51) Int. Cl.
*B28B 11/00*  (2006.01)
*B01D 46/24*  (2006.01)
(Continued)

(52) U.S. Cl.
CPC .......... *B28B 11/007* (2013.01); *B01D 46/247* (2013.01); *B01D 46/2418* (2013.01);
(Continued)

(58) Field of Classification Search
CPC . B28B 11/007; B01D 46/2474; B32B 37/146; B32B 38/004
See application file for complete search history.

(56) References Cited

U.S. PATENT DOCUMENTS 8,000,516 B2    8/2011    Ito et al.
2008/0157441 A1    7/2008    Ito et al.

FOREIGN PATENT DOCUMENTS

JP    2001-300922 A1    10/2001
JP    2008-055736 A1    3/2008
(Continued)

OTHER PUBLICATIONS

International Search Report and Written Opinion (Application No. PCT/JP2015/053015) dated Apr. 21, 2015.

*Primary Examiner* — Mark A Osele
*Assistant Examiner* — Christopher C Caillouet
(74) *Attorney, Agent, or Firm* — Burr & Brown, PLLC

(57) ABSTRACT

The present invention includes recognizing, as positions of outermost circumferential cells, positions each of which is calculated from an average cell pitch of usual cells and each of which is present on an inner side from a circumference of an end face of a honeycomb structure; disposing, on the basis of the recognition, virtual perforation regions at positions on a sheet which correspond to the outermost circumferential cells to be plugged, each of the virtual perforation regions being divided into a plurality of squares; and performing perforation processing of perforating at least one of a plurality of squares in each of the virtual perforation regions. Positions and a number of squares to be perforated in each of the virtual perforation regions are individually set in accordance with each of the positions of the outermost circumferential cells to be plugged to which each of the virtual perforation regions corresponds.

4 Claims, 7 Drawing Sheets

(51) Int. Cl.
*B32B 37/14* (2006.01)
*B32B 38/00* (2006.01)
*C04B 35/195* (2006.01)
*C04B 38/00* (2006.01)
*F01N 3/022* (2006.01)

(52) U.S. Cl.
CPC ........ *B01D 46/2474* (2013.01); *B32B 37/146* (2013.01); *B32B 38/0004* (2013.01); *C04B 35/195* (2013.01); *C04B 38/0006* (2013.01); *F01N 3/0222* (2013.01); *B01D 2279/30* (2013.01); *B32B 2307/412* (2013.01); *B32B 2310/0843* (2013.01); *C04B 2235/3481* (2013.01); *F01N 2330/06* (2013.01); *F01N 2330/48* (2013.01); *Y02T 10/20* (2013.01)

(56) References Cited

FOREIGN PATENT DOCUMENTS

| | | | |
|---|---|---|---|
| JP | 2011-255672 | A1 | 12/2011 |
| WO | 2008/081649 | A1 | 7/2008 |

METHOD FOR PRODUCING PLUGGED HONEYCOMB STRUCTURE

TECHNICAL FIELD

The present invention relates to a method for producing a honeycomb structure (a plugged honeycomb structure) in which one end portion of each cell is plugged for use in a diesel particulate filter (DPF) or the like.

BACKGROUND ART

An exhaust gas emitted from an internal combustion engine such as a diesel engine includes a large amount of particulate matter (PM) in which carbon that becomes a cause for environmental pollution is a main component. Therefore, it is general that a filter (DPF) to trap (filter) the PM is mounted in each of exhaust systems of such engines.

Usually, in the filter for use in such a purpose, there is used a plugged honeycomb structure 1 including a honeycomb structure 2 and plugging portions 11 as shown in FIG. 13 and FIG. 14. The honeycomb structure 2 has a structure in which a porous partition wall 7 defines and forms a plurality of cells 9 communicating between two end faces 3 and 5. The plugging portions 11 are arranged to plug one of two open ends of each of the cells 9 so that the honeycomb structure 2 has complementary checkerboard patterns on one end face 3 side and the other end face 5 side.

The exhaust gas flows into the filter including the plugged honeycomb structure 1 from one end face 3 of the filter, to remove the PM included in the exhaust gas, and then flows out from the other end face 5. Specifically, the exhaust gas first flows into a cell 9b in which an end portion in the one end face 3 of the filter is not sealed but an end portion in the other end face 5 is sealed. Next, the exhaust gas flowing into the cell 9b permeates the porous partition wall 7 to move into a cell 9a in which an end portion in the one end face 3 is sealed and an end portion in the other end face 5 is not sealed. Here, when the exhaust gas permeates the porous partition wall 7, the partition wall 7 becomes a filter layer, and the PM in the exhaust gas is trapped by the partition wall 7 and deposited on the partition wall 7. Consequently, the exhaust gas, from which the PM is removed and which moves into the cell 9a, then flows out from the other end face 5.

As a method for producing the above-mentioned plugged honeycomb structure, such a method as described in Patent Document 1 is known. In this method, a transparent sheet or the like is first attached to an end face of a honeycomb formed body to image the end face. Next, by performing image processing of an image obtained by imaging the end face, positions of the cells are recognized, and on the basis of the recognition, perforation processing is performed by laser processing or the like at positions on the above sheet which correspond to the cells to be plugged. Afterward, an end portion of the honeycomb structure is immersed into a plugging slurry in which a material of the plugging portions is slurried, and the end portions of the cells to be plugged are charged with the plugging slurry from holes formed in the sheet by the perforation processing to form the plugging portions.

In this producing method, the positions of the cells are recognized by the image processing as described above. Specifically, the image of the end face of the honeycomb structure imaged with a CCD (charge-coupled device) camera or the like is first subjected to binarization processing. Further, in a case where a black image of one block in the image after the binarization processing forms a predetermined cell shape (e.g., a quadrangular shape) or reaches a certain ratio (e.g., 80% or more) of a predetermined cell area, the image is regarded as the cell to recognize its position. It is to be noted that an image which does not form the predetermined cell shape or does not reach the certain ratio of the predetermined cell area is regarded as a foreign substance such as dust adhered to the end face of the honeycomb structure, to prevent the position from being subjected to the perforation processing by mistake.

However, among the cells, the cell positioned in an outermost circumferential portion of the honeycomb structure (the outermost circumferential cell) has a partially cut-off shape and an area of the cell decreases as compared with the other cells (usual cells), and hence in such image processing as described above, the position is often not recognized as the cell. Further, even when the outermost circumferential cell whose position is not recognized by the image processing is to be originally plugged, the perforation processing is not performed at a position on the sheet which corresponds to the outermost circumferential cell and the outermost circumferential cell is not charged with the plugging slurry. Consequently, as a result, any plugging portions are not formed, and there remains the outermost circumferential cell in which both end portions are left open.

In the outermost circumferential cell in which both the end portions are left open, a larger part of the PM in the exhaust gas flowing into the cell is not trapped but passes through the honeycomb structure, and hence the presence of the cell becomes a factor to deteriorate a performance of the filter.

It is to be noted that in the conventional perforation processing, it is general that a size of the hole made at a position on the sheet which corresponds to the usual cell is the same as a size of the hole made at a position on the sheet which corresponds to the outermost circumferential cell. Consequently, in a case where when performing the method described in Patent Document 1, even an image in which an area ratio to the predetermined cell area is comparatively small is regarded as the cell in the image after the binarization processing to prevent generation of the outermost circumferential cell in which the plugging portion is not formed, the problem occurs as follows.

That is, in the case where even the image in which the area ratio to the predetermined cell area is comparatively small is regarded as the cell, the hole made at the position on the sheet which corresponds to the cell (the image) does not fall in an open range of the cell but would reach another adjacent cell or an outer side from a circumference of the honeycomb structure. Further, in such a case, the plugging slurry passing though the holes formed in the sheet leaks to the other adjacent cells or the outside of the honeycomb structure to adhere to inner peripheral surfaces of the other cells or a circumferential wall of the honeycomb structure. As a result, after forming the plugging portions, there is required a step of removing the plugging slurry adhered to the inner peripheral surfaces of the other adjacent cells or the circumferential wall of the honeycomb structure as described above, which causes increase of the number of producing steps and accompanying rise of producing cost.

Furthermore, as a method for producing a plugged honeycomb structure to prevent generation of outermost circumferential cells in which any plugging portions are not formed, such a method as described in Patent Document 2 has been suggested. In this method, for usual cells, by performing image processing of an image of an end face of the imaged honeycomb structure in the same manner as in the method described in Patent Document 1, positions of the cells are recognized, and on the basis of the recognition, perforation processing is performed at positions on a sheet which correspond to the cells to be plugged. On the other hand, for the outermost circumferential cell, its position is calculated and recognized from an average cell pitch calculated from the positions of the usual cells recognized by the above image processing, and on the basis of the recognition, the perforation processing is performed at the positions on the sheet which correspond to the cells to be plugged. Thus, the position of the outermost circumferential cell is not recognized by an image of the outermost circumferential cell itself, but the position of the outermost circumferential cell is calculated and recognized from the average cell pitch of the usual cells, thereby securely performing the perforation processing at the position on the sheet which corresponds to the outermost circumferential cell to be plugged. Further, as a result, in the image processing, even the small outermost circumferential cell whose position is not recognized as the cell is charged with a plugging slurry to form a plugging portion.

However, in the method of calculating and recognizing the position of the outermost circumferential cell only from the average cell pitch of the usual cells, the recognized position of the outermost circumferential cell would become a position on an outer side from a circumference of the end face of the honeycomb structure. Further, in this case, the perforation processing is performed even at the position on the sheet on the outer side from the circumference of the end face of the honeycomb structure, and the plugging slurry passing through the holes formed by this perforation processing leaks out from the honeycomb structure, thereby adhering to a circumferential wall of the honeycomb structure. As a result, after forming the plugging portions, there is required a step of removing the plugging slurry adhered to the circumferential wall of the honeycomb structure as described above, which causes the increase of the number of the producing steps and the accompanying rise of the producing cost.

CITATION LIST

Patent Documents

[Patent Document 1] JP-A-2001-300922
[Patent Document 2] WO 2008/081649

SUMMARY OF THE INVENTION

Problem to be Solved by the Invention

The present invention has been developed in view of such situations, and an object thereof is to prevent a plugging slurry from adhering to an inner peripheral surface of another cell adjacent to an outermost circumferential cell or a circumferential wall of a honeycomb structure, when forming a plugging portion in the outermost circumferential cell.

Means for Solving the Problem

To achieve the above object, according to the present invention, there is provided a method for producing a plugging honeycomb structure as follows.

[1] A method for producing a plugged honeycomb structure including a honeycomb structure in which a porous partition wall defines and forms a plurality of cells communicating between two end faces of the honeycomb structure, and plugging portions which are arranged to plug one of two open ends of each of the plurality of cells, the plurality of cells being constituted of outermost circumferential cells positioned in an outermost circumferential portion of the honeycomb structure, and usual cells other than the outermost circumferential cells, the method including: attaching a transparent sheet to an end face of the honeycomb structure; imaging the end face; performing image processing of an image obtained by imaging the end face to recognize positions of the usual cells; performing perforation processing, on the basis of the recognition of the positions of the usual cells, at the positions on the sheet which correspond to the usual cells to be plugged; recognizing, as positions of the outermost circumferential cells, positions each of which is calculated from an average cell pitch of the usual cells whose positions are recognized by the image processing, each of the positions calculated from the average cell pitch being present on an inner side from a circumference of the end face of the honeycomb structure; disposing, on the basis of the recognition of the positions of the outermost circumferential cells, virtual perforation regions at positions on the sheet which correspond to the outermost circumferential cells to be plugged, each of the virtual perforation regions being divided into a plurality of squares; performing perforation processing of perforating at least one of the plurality of squares in each of the virtual perforation regions, the perforation processing including individually setting positions and a number of squares to be perforated in each of the virtual perforation regions in accordance with each of the positions of the outermost circumferential cells to be plugged to which each of the virtual perforation regions corresponds; immersing an end portion of the honeycomb structure into a plugging slurry in which a material of the plugging portions is slurried, after the perforation processing at the positions corresponding to the usual cells and in each of the virtual perforation regions; and forming the plugging portions by charging end portions of the plurality of cells to be plugged with the plugging slurry through holes formed in the sheet by the perforation processing at the positions corresponding to the usual cells and in each of the virtual perforation regions.

[2] The method for producing the plugged honeycomb structure according to the above [1], wherein the positions and the number of squares to be perforated in each of the virtual perforation regions are set so that a hole made by perforation is present only in an open range of each of the outermost circumferential cells to be plugged.

[3] The method for producing the plugged honeycomb structure according to the above [1] or [2], wherein the perforation processing at the positions corresponding to the usual cells and in each of the virtual perforation regions is carried out by using laser.

Effect of the Invention

According to a method for producing a plugged honeycomb structure of the present invention, when forming a plugging portion in an outermost circumferential cell of the honeycomb structure, it is possible to prevent a plugging slurry from adhering to an inner peripheral surface of another cell adjacent to the outermost circumferential cell and a circumferential wall of the honeycomb structure. As a result, after forming the plugging portions, there is not required a step of removing the plugging slurry adhered to the inner peripheral surface of the adjacent other cell and the circumferential wall of the honeycomb structure as described above, and it is possible to achieve decrease of the number of producing steps and drop of producing cost.

MODE FOR CARRYING OUT THE INVENTION

Hereinafter, a representative embodiment of the present invention will specifically be described, but it should be understood that the present invention is not limited to the following embodiment, and change, improvement or the like of design is suitably added on the basis of ordinary knowledge of a person skilled in the art without departing from the gist of the present invention. It is to be noted that in the present description, when "a honeycomb structure" is simply referred, there is meant the honeycomb structure which does not have any plugging portions (before forming the plugging portions).

Figure 1:
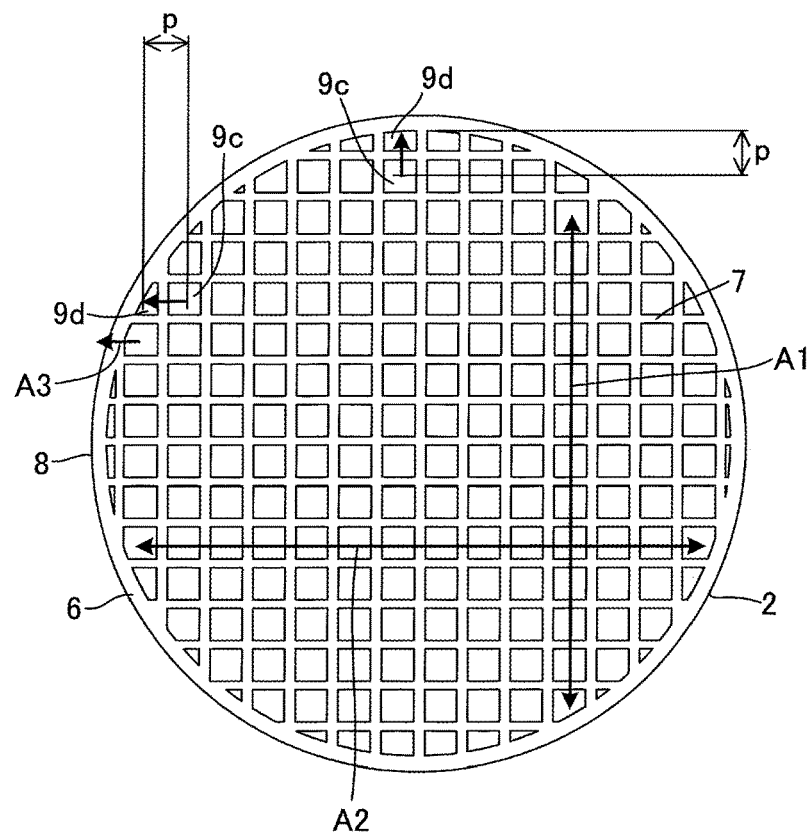
FIG. 1 is a schematic plan view showing an end face of a honeycomb structure.

FIG. 1 is a schematic plan view showing an end face of a honeycomb structure. The present invention is a method for producing a plugged honeycomb structure including a honeycomb structure in which a porous partition wall defines and forms a plurality of cells communicating between two end faces, and plugging portions arranged to plug one of two open ends of each of the cells. In the honeycomb structure for use in a use application of a filter or the like, it is necessary to plug one of the two open ends of each cell in this manner, and for this purpose, it is first necessary to recognize positions of the cells in the end face of the honeycomb structure. In the present invention, the positions of the cells are recognized by different methods for outermost circumferential cells 9d positioned in an outermost circumferential portion of the honeycomb structure and usual cells 9c other than the outermost circumferential cells 9d.

Figure 2:
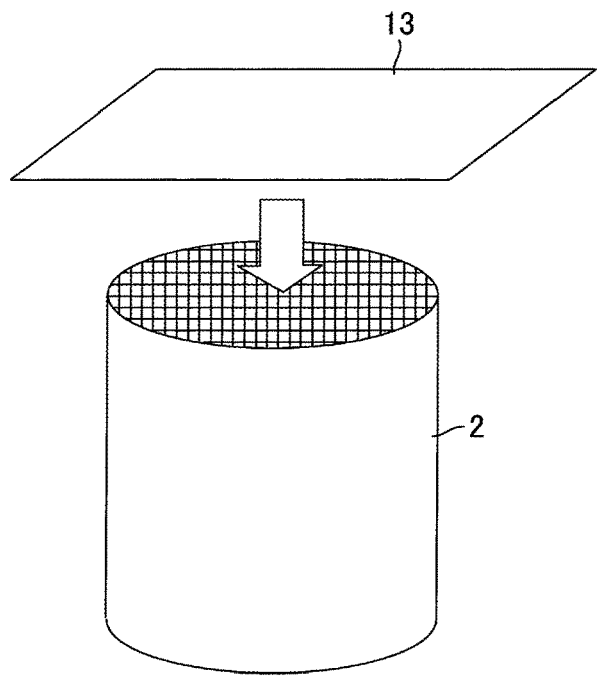
FIG. 2 is a schematic perspective view showing a method of attaching a sheet to the end face of the honeycomb structure.

That is, for the usual cells 9c, as shown in FIG. 2, after attaching a transparent sheet 13 to the end face of the honeycomb structure 2 and imaging the end face, image processing of an image obtained by imaging the end face is performed to recognize positions of the usual cells 9c. As the sheet 13, a commercially available adhesive sheet is usable. There is not any special restriction on an imaging device to image the end face of the honeycomb structure 2, but a CCD camera, an X-ray CT (computed tomography) scanner or the like is suitably usable. As the CCD camera, for example, a high-performance CCD camera manufactured by KEYENCE Corp. or the like is suitably usable. Furthermore, "the image processing" mentioned herein specifically means "binarization processing". "The binarization processing" is processing to classify color of image data into, for example, 256 gradations, and define a threshold value as a boundary, thereby converting the data into a binary image only of white and black in which a portion of luminance higher than this boundary is white and a portion of lower luminance is black. By this binarization processing, it is possible to distinguish a partition wall portion (white) and a cell portion (black) of the honeycomb structure.

Thus, in a case where in the image of the end face of the honeycomb structure subjected to the image processing, a black image of one block forms a predetermined cell shape (e.g., a quadrangular shape) or reaches a certain ratio (e.g., 80% or more) of a predetermined cell area, the image is regarded as the cell and a position of the cell is recognized. The outermost circumferential cell 9d comes in contact with a circumferential wall 6 of the honeycomb structure 2, thereby cutting off a part of an original cell shape, but even when slight deformation occurs in a producing process of the honeycomb structure, the usual cell 9c keeps a substantially original cell shape and cell area. Consequently, the usual cell 9c is substantially securely regarded as the cell by this image processing. Thus, after recognizing the positions of the usual cells 9c in the end face of the honeycomb structure 2, on the basis of the recognized positions, perforation processing is performed at positions on the sheet 13 attached to the end face which correspond to the usual cells 9c to be plugged.

It is to be noted that when imaging the end face of the honeycomb structure 2, it is preferable to remove a foreign substance such as dust adhered to the end face before the sheet is attached, by air blowing or the like, from the viewpoint of avoiding false recognition between the cell and the foreign substance during the cell recognition after the image processing. Furthermore, from the similar viewpoint, in one block of image in the image subjected to the image processing, the image in which the number of pixels forming the image is not more than the predetermined number of the pixels may be regarded as the foreign substance of the dust or the like and removed from a judgment target.

On the other hand, the outermost circumferential cell 9d comes in contact with the circumferential wall 6 of the honeycomb structure 2, thereby cutting off a part of the original cell shape, and hence it is difficult to recognize the cell by the image processing. To eliminate such a problem, in the present invention, an average cell pitch p is calculated from the positions of the usual cells 9c which are recognized by the above image processing, and a position of the outermost circumferential cell 9d is calculated from the average cell pitch p. Specifically, in cell arranging directions shown by arrows A1 and A2 in FIG. 1, a position moved from the cell present on the most circumferential side in the usual cells 9c (the usual cell adjacent to the outermost circumferential cell) as much as the average cell pitch p on a circumferential side of the honeycomb structure 2 is recognized as the position of the outermost circumferential cell 9d.

However, in the method of calculating and recognizing the position of the outermost circumferential cell only from the average cell pitch p of the usual cells 9c, the recognized position of the outermost circumferential cell would be a position on an outer side from a circumference 8 of the end face of the honeycomb structure 2 (e.g., a distal position of an arrow A3 in FIG. 1). Consequently, in the present invention, the position which is calculated from the average cell pitch p of the usual cells 9c as described above and is present on an inner side from the circumference 8 of the end face of the honeycomb structure 2 is only recognized as the position of the outermost circumferential cell 9d. It is to be noted that a position of the circumference 8 of the end face of the honeycomb structure 2 can easily be specified from the image of the end face of the honeycomb structure 2 imaged for the above image processing.

Figure 3:
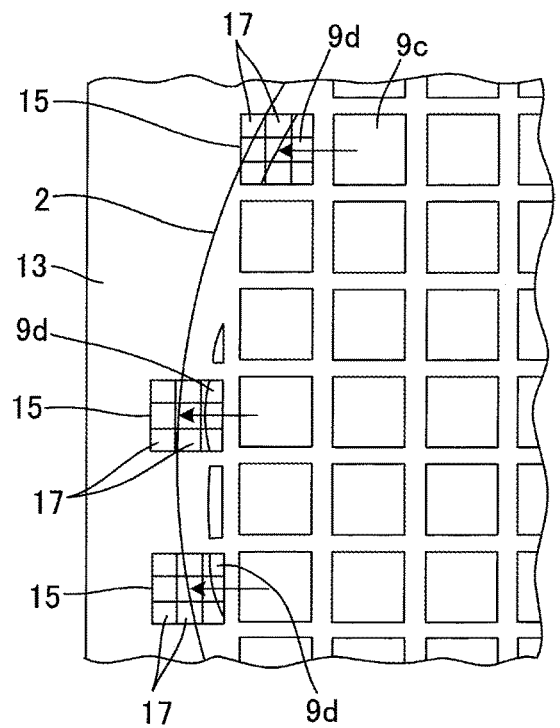
FIG. 3 is a schematic plan view showing a state where a virtual perforation region is disposed at a position on the sheet which corresponds to an outermost circumferential cell to be plugged.

Thus, the position of the outermost circumferential cell 9d is recognized, and then on the basis of the recognized position, as shown in FIG. 3, a virtual perforation region 15 is disposed at the position on the sheet 13 which corresponds to the outermost circumferential cell 9d to be plugged, the sheet being attached to the end face of the honeycomb structure 2.

A circumferential shape of the virtual perforation region 15 is the same as a shape of the usual cell 9c, and is divided into a plurality of squares 17. In the present invention, the perforation processing to perforate at least one of the plurality of squares 17 is performed in each virtual perforation region 15 disposed in the sheet 13 as described above. During this perforation processing, positions and a number of squares 17 to be perforated in each virtual perforation region 15 are individually set in accordance with the position of the outermost circumferential cell 9d to which each virtual perforation region 15 corresponds. As a reference when individually setting the positions and the number of squares 17 to be perforated, for example, the position of the outermost circumferential cell 9d to which each virtual perforation region 15 corresponds can be represented as follows.

Figure 4:
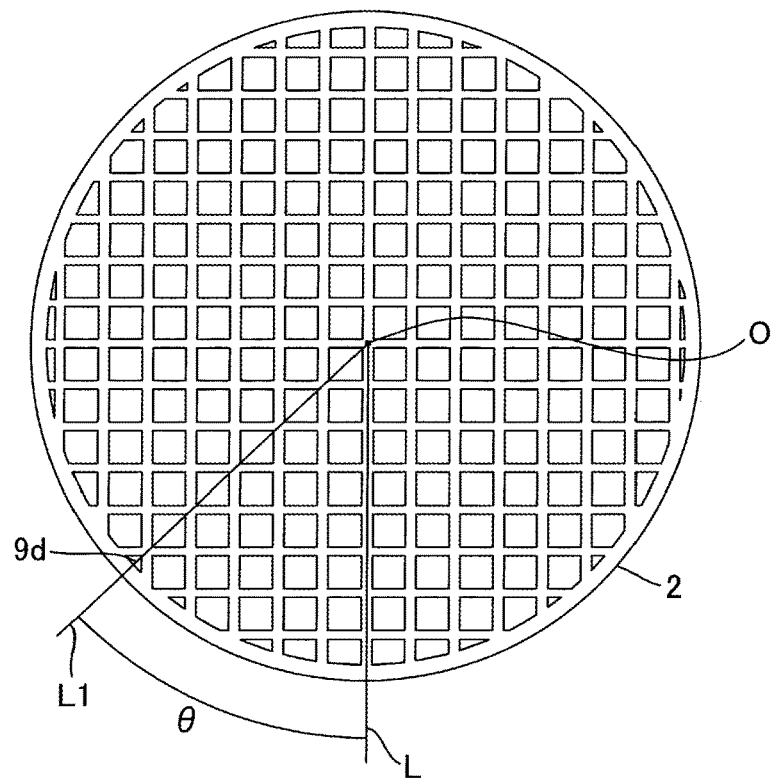
FIG. 4 is a schematic plan view to explain one example of representation of a position of the outermost circumferential cell.

First, as shown in FIG. 4, one straight line extending from a center O of the end face of the honeycomb structure 2 along the cell arranging direction in a radius direction of the honeycomb structure 2 is defined as a reference line L. Here, in a case where a shape of the end face of the honeycomb structure is circular, it is meant that the center O of the end face of the honeycomb structure 2 is a center of the circle, and in a case where the shape of the end face of the honeycomb structure is a shape other than the circular shape, there is meant a center of the largest circle included in the end face of the honeycomb structure 2. An angle of an arc θ formed by the reference line L and a straight line L1 extending from the center O of the end face of the honeycomb structure 2 in a predetermined direction of the outermost circumferential cell 9d represents the position of the outermost circumferential cell 9d. For example, in FIG. 4, when the angle of the arc θ formed by the reference line L and the straight line L1 extending from the center O of the end face of the honeycomb structure 2 toward the outermost circumferential cell 9d is 45°, the outermost circumferential cell 9d is represented as "the outermost circumferential cell positioned in a 45° direction". The position of the outermost circumferential cell 9d is represented by such a method, so that it is possible to distinguish the plurality of outermost circumferential cells 9d which are present at different positions, respectively.

The outermost circumferential cell 9d comes in contact with the circumferential wall 6 of the honeycomb structure 2 as described above, thereby cutting off a part of the original cell shape, and hence the outermost circumferential cell possesses a shape which is different from that of the usual cell 9c. Further, the shape of the outermost circumferential cell 9d is not constant and varies with its position. Consequently, in the present invention, the positions and the number of squares 17 to be perforated in each virtual perforation region 15 are individually set in accordance with the position of the outermost circumferential cell 9d to which each virtual perforation region 15 corresponds.

Figure 5:
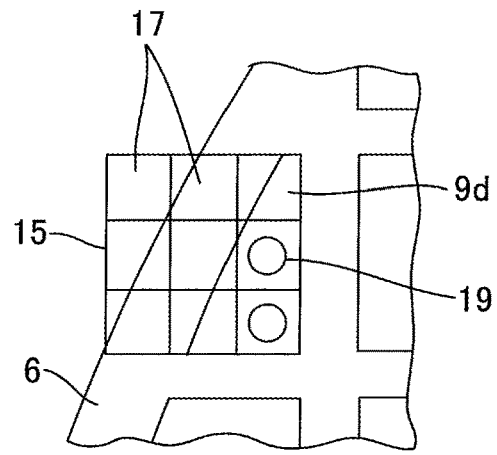
FIG. 5 is a partially enlarged view showing a shape of the outermost circumferential cell positioned in a 120° direction, and positions and a number of squares to be perforated in a virtual perforation region disposed at a position corresponding to the outermost circumferential cell.

For example, FIG. 5 is a partially enlarged view showing a shape of the outermost circumferential cell positioned in a 120° direction, and the positions and the number of squares to be perforated in the virtual perforation region disposed at the position corresponding to the outermost circumferential cell. In this example, in the squares 17 divided into nine squares (three vertical squares×three horizontal squares) in the virtual perforation region 15 disposed at the positions on the sheet which correspond to the outermost circumferential cells 9d to be plugged, the square on a right side in a middle stage and the square on the right side in a lower stage are perforated to form two holes 19.

Figure 6:
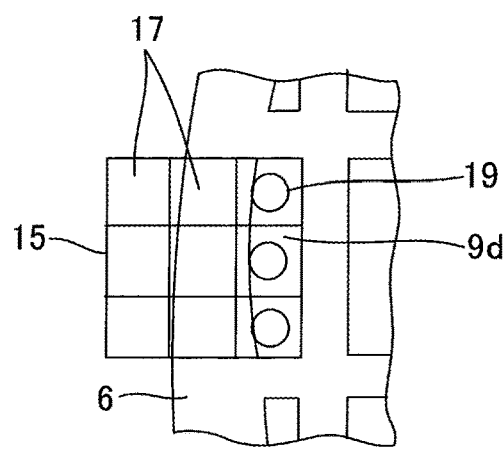
FIG. 6 is a partially enlarged view showing a shape of an outermost circumferential cell positioned in a 95° direction, and positions and a number of squares to be perforated in a virtual perforation region disposed at a position corresponding to the outermost circumferential cell.

FIG. 6 is a partially enlarged view showing a shape of the outermost circumferential cell positioned in a 95° direction, and the positions and the number of squares to be perforated in the virtual perforation region disposed at the position corresponding to the outermost circumferential cell. In this example, in the squares 17 divided into nine squares (three vertical squares×three horizontal squares) in the virtual perforation region 15 disposed at the positions on the sheet which correspond to the outermost circumferential cells 9d to be plugged, the square on a right side in an upper stage, the square on the right side in a middle stage and the square on the right side in a lower stage are perforated to form three holes 19.

Figure 7:
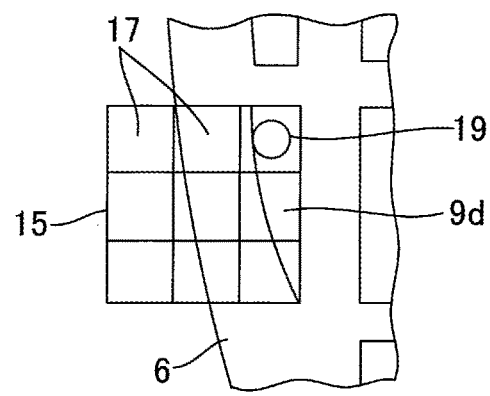
FIG. 7 is a partially enlarged view showing a shape of an outermost circumferential cell positioned in a 80° direction, and positions and a number of squares to be perforated in a virtual perforation region disposed at a position corresponding to the outermost circumferential cell.

FIG. 7 is a partially enlarged view showing a shape of the outermost circumferential cell positioned in a 80° direction, and the positions and the number of squares to be perforated in the virtual perforation region disposed at the position corresponding to the outermost circumferential cell. In this example, in the squares 17 divided into nine squares (three vertical squares×three horizontal squares) in the virtual perforation region 15 disposed at the position on the sheet which corresponds to the outermost circumferential cell 9d to be plugged, the square on a right side in an upper stage is perforated to form one hole 19.

As shown in FIG. 5 to FIG. 7, the positions and the number of squares to be perforated are set so that the holes 19 formed by the perforation are present only in an open range of the outermost circumferential cell 9d to be plugged and are not present in an open range of another cell adjacent to the outermost circumferential cell 9d or on an outer side of the circumferential wall 6 of the honeycomb structure 2.

Also in the virtual perforation region disposed at the position corresponding to the outermost circumferential cell to be plugged except the outermost circumferential cells shown in FIG. 5 to FIG. 7, the positions and the number of squares to be perforated are individually set on the basis of a similar viewpoint.

In this setting, when forming the plugging portion in the outermost circumferential cell of the honeycomb structure, the hole formed in the sheet is shaped to match the outermost circumferential cell, the outermost circumferential cell to be plugged is securely charged with a plugging slurry passing through the hole, and the plugging slurry does not leak out from the outermost circumferential cell to be plugged. That is, it is possible to prevent the plugging slurry to adhering to an inner peripheral surface of the other cell adjacent to the outermost circumferential cell to be plugged or the circumferential wall of the honeycomb structure. Further, as a result, after forming the plugging portion, there is not required a step of removing the plugging slurry adhered to the inner peripheral surface of the adjacent other cell or the circumferential wall of the honeycomb structure, and it is possible to achieve decrease of the number of producing steps and accompanying drop of producing cost.

It is to be noted that in the above embodiment, each virtual perforation region is divided into nine (three vertical squares×three horizontal squares) squares, but there is not any special restriction on the number of squares of each virtual perforation region as long as the number is plural. That is, the number of squares of each virtual perforation region can suitably be set in accordance with a dimension of each cell, perforating position adjustment accuracy of an apparatus for use in the perforation processing and the like.

Furthermore, when a structure (the shape/dimension of the end face, the shape of the usual cell, a cell density, the average cell pitch or the like) of the honeycomb structure is different, even the outermost circumferential cells positioned in the same direction are different in shape. Therefore, when carrying out the producing method of the present invention, it is preferable to beforehand grasp a relation between the position and the shape of each outermost circumferential cell for each structure in the honeycomb structure in which the plugging portions are to be formed, and to reflect the relation in the above-mentioned setting of the positions and the number of squares to be perforated. The setting of the positions and the number of squares to be perforated may be performed manually or performed automatically.

In the present invention, there is not any special restriction on the method of the perforation processing to the sheet, but it is preferable to carry out the perforation processing by use of laser, from the viewpoint of treatment speed, correctness or easiness in correspondence to automation. For example, an XYZθ stage on which the honeycomb structure is mounted is positioned on the basis of the recognized positions of the cells by the above method, and the positions on the sheet which correspond to the cells to be plugged are irradiated with the laser to perform the perforation processing. It is to be noted that the perforation processing may be performed to the whole end face once, or the end face may be divided into a plurality of small blocks to carry out the perforation processing for each of the small blocks. It is preferable that an area of the hole to be made in the sheet is from about 30 to 70% of the cell area, and it is desirable that the area is adjusted to be smaller when viscosity of the slurry for use in the plugging is low, and to be larger when the viscosity is high. "The area of the hole to be made in the sheet" mentioned herein means the area of the hole made in the square of the virtual perforation region in a case where the square of the virtual perforation region disposed at the position on the sheet which corresponds to the position of the outermost circumferential cell is perforated.

Figure 13:
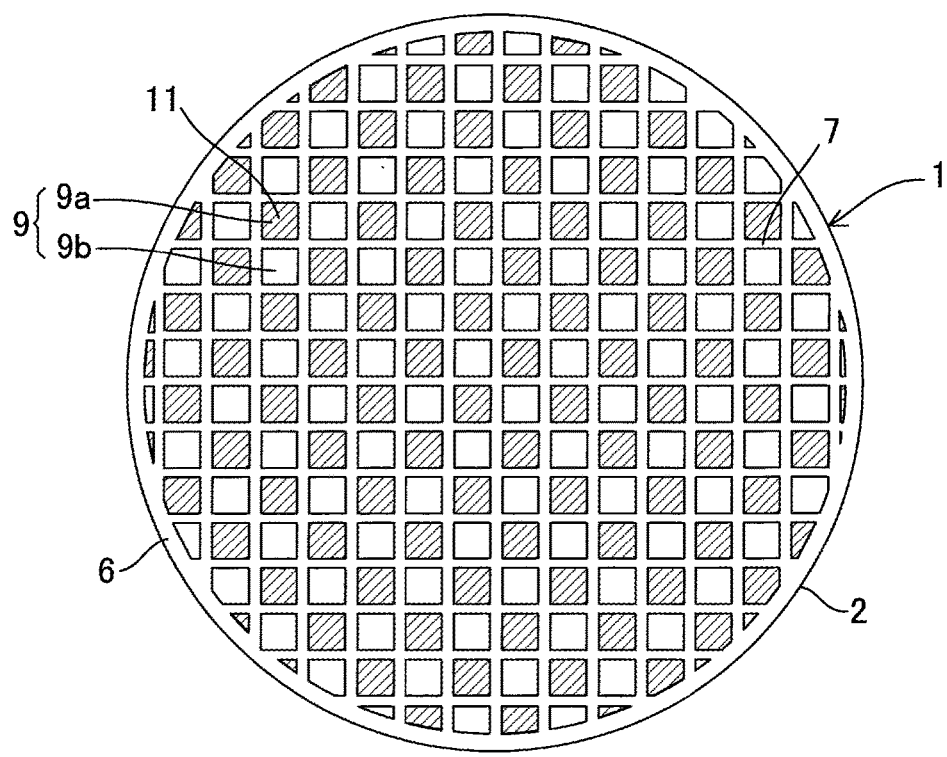
FIG. 13 is a schematic plan view showing a basic structure of a plugged honeycomb structure seen from one end face side.
Figure 14:
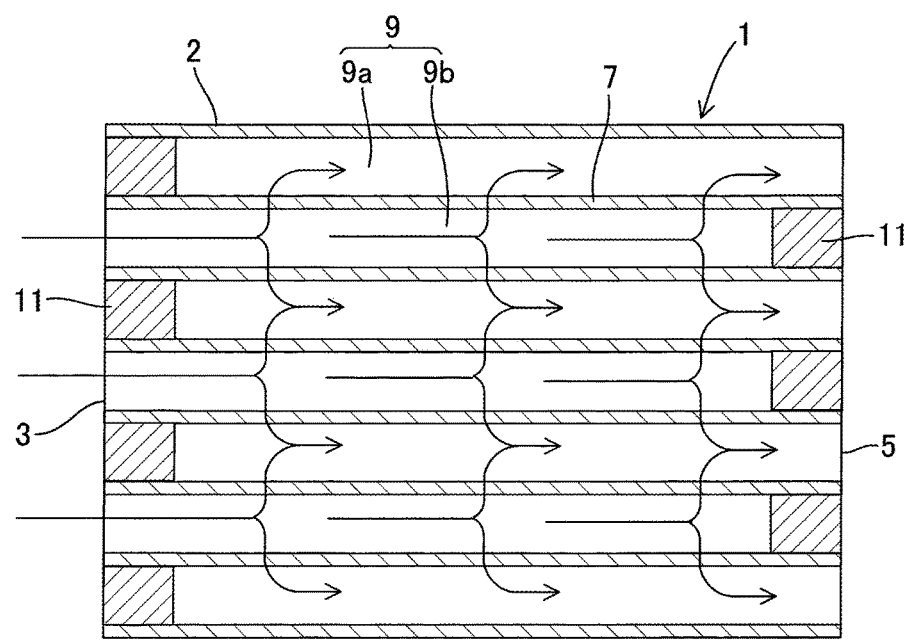
FIG. 14 is a schematic cross-sectional view showing the basic structure of the plugged honeycomb structure.

Thus, the sheet is subjected to the perforation processing, an end portion of the honeycomb structure to which the sheet is attached is immersed into the plugging slurry in which a material of the plugging portions is slurried, and end portions of the cells to be plugged are charged with the plugging slurry through the holes formed in the sheet by the perforation processing to form the plugging portions. Afterward, when necessary, drying and/or firing is performed to obtain the plugged honeycomb structure. There is not any special restriction on positions of the cells to be plugged, i.e., a plugging pattern, but in the case of use in a use application of a filter such as a DPF, as shown in FIG. 13 and FIG. 14, it is general that the plugging portions 11 are arranged to form the complementary checkerboard patterns on the one end face 3 side and the other end face 5 side of the honeycomb structure 2.

It is to be noted that a state of the honeycomb structure at a time of charging with the plugging slurry may be a state of an already fired sintered body or a state of a formed body before fired. In the case of the formed body, it is necessary to fire the whole honeycomb structure after the formed body is charged with the plugging slurry.

There is not any special restriction on a material constituting the honeycomb structure, but the partition wall needs to be porous in a fired state, and hence the honeycomb structure made of ceramic (e.g., cordierite or the like) is usually suitably used. There is also not any special restriction on a shape of the honeycomb structure, and various shapes such as a round pillar shape, a quadrangular pillar shape and a triangular pillar shape are employable. The cell shape of the honeycomb structure is most generally a quadrangular shape, but additionally, a polygonal shape such as a triangular shape, a hexagonal shape or an octagonal shape, a round shape or any combination of these shapes may be employed.

In the case of use as a filter such as the DPF, a thickness of the partition wall of the honeycomb structure is preferably from 100 to 2000 μm, more preferably from 200 to 1000 μm, and further preferably from 300 to 700 μm. When the thickness of the partition wall is smaller than 100 μm, strength runs short and a thermal shock resistance would deteriorate, whereas when the thickness of the partition wall is in excess of 2000 μm, there is the tendency that pressure loss increases.

The cell density of the honeycomb structure is preferably from 20 to 600 cells/in$^2$ (cpsi) (from 3.1 to 93 cells/cm$^2$), more preferably from 50 to 400 cpsi (from 7.75 to 62 cells/cm$^2$) and further preferably from 100 to 300 cpsi (from 15.5 to 46.5 cells/cm$^2$). This is because when the cell density is smaller than 20 cpsi (3.1 cells/cm$^2$), there is the tendency that a contact efficiency with an exhaust gas runs short, whereas when the cell density is in excess of 600 cpsi (93 cells/cm$^2$), there is the tendency that the pressure loss increases. It is to be noted that "cpsi" is an abbreviation for "cells per square inch" and is a unit indicating the number of the cells per square inch. For example, 10 cpsi is about 1.55 cells/cm$^2$.

A porosity of the honeycomb structure is preferably from 30 to 90%, more preferably from 45 to 80%, and further preferably from 50 to 70%. This is because by setting the porosity to be from 30 to 90%, it is possible to decrease the pressure loss, and additionally, it is possible to hold a mechanical strength of the structure.

It is preferable that an average pore diameter (pore diameters) of the honeycomb structure is from 5 to 500 μm. When the average pore diameter is smaller than 5 μm, there is the tendency that the pressure loss rises, whereas when the average pore diameter is in excess of 500 μm, there is the tendency that a trapping efficiency deteriorates in the case of the use in the filter.

There is not any special restriction on a method for producing such a honeycomb structure, but the honeycomb structure can be produced by, for example, a heretofore known producing method of extruding a ceramic kneaded material adjusted into an appropriate viscosity by use of a die having desirable cell shape, partition wall thickness and cell density, and drying and/or firing an obtained formed body, or the like.

The plugging slurry can be prepared by mixing, for example, ceramics powder and a dispersing medium (e.g., water or the like). Furthermore, when necessary, additives such as a bonding agent, a deflocculating agent and a foamable resin may be added. There is not any special restriction on a material of the ceramics powder, but it is preferable that the material is the same as in the honeycomb structure. As the bonding agent, polyvinyl alcohol, methylcellulose or the like is suitably usable.

EXAMPLES

Hereinafter, the present invention will be described in more detail on the basis of examples, but the present invention is not limited to these examples.

Example 1

Figure 8:
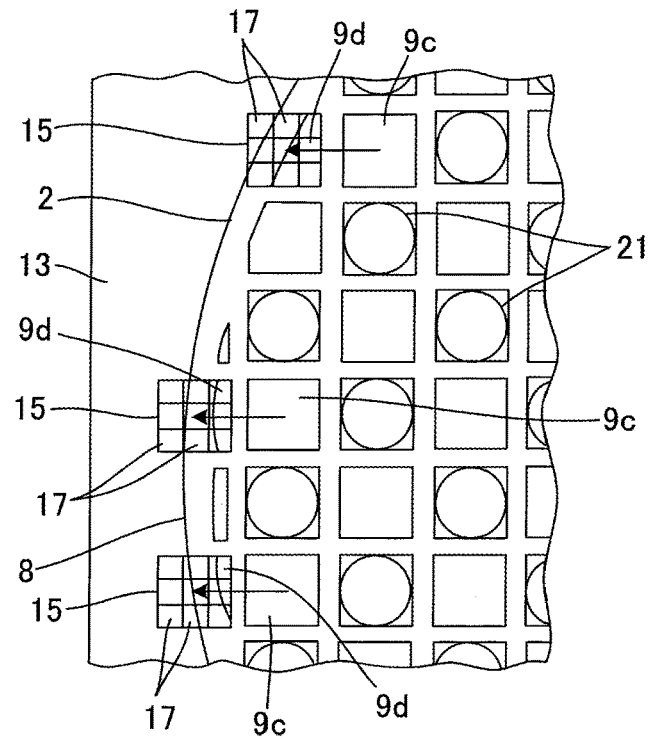
FIG. 8 is a schematic plan view to explain a method of perforation processing in Example 1.

A commercially available transparent adhesive sheet was attached to an end face of a porous honeycomb structure made of cordierite. In the honeycomb structure, there was used a honeycomb structure in which a length was 150 mm, an outer diameter was 140 mm, a partition wall thickness was 300 μm, a cell shape (a shape of a usual cell) was square, a cell density was 300 cpsi (46.5 cells/cm$^2$), and a designed cell pitch was 1.5 mm. The end face of the honeycomb structure to which the adhesive sheet was attached was imaged with a CCD camera, to subject an obtained image to image processing (binarization processing), and in a case where a black image of one block in the processed image reached 80% or more of a cell area of predetermined design, the image was regarded as the usual cell, to recognize a position of the cell. Additionally, an image resolution of the image processing was set to 0.06 mm/pixel. Furthermore, an average cell pitch was calculated from the usual cells whose positions were recognized in this manner. Further, as shown in FIG. 8, there was recognized, as a position of an outermost circumferential cell 9d, a position moved from a cell present on the most circumferential side in usual cells 9c as much as an average cell pitch on a circumferential side of a honeycomb structure 2 in a cell arranging direction, the position being on an inner side from a circumference 8 of an end face of the honeycomb structure 2. After recognizing the positions of the usual cells and the outermost circumferential cells in the end face of the honeycomb structure in this manner, an XYZθ stage on which the honeycomb structure was mounted was positioned on the basis of the recognized positions, and positions on the adhesive sheet which corresponded to the cells to be plugged were irradiated with laser to perform perforation processing. The cells to be plugged were alternately present in the cell arranging direction so that the plugged end face had a checkerboard pattern. As shown in FIG. 8, the perforation processing at positions on an adhesive sheet 13 which corresponded to the usual cells 9c to be plugged was performed by forming holes 21 of the same shape one by one at the respective positions. On the other hand, in the perforation processing at the positions on the adhesive sheet which corresponded to the outermost circumferential cells 9d to be plugged, as shown in FIG. 8, a virtual perforation region 15 was first disposed at the position on the adhesive sheet 13 which corresponded to the outermost circumferential cell 9d to be plugged. The virtual perforation region 15 was divided into nine (three vertical squares×three horizontal squares) squares 17. In each virtual perforation region 15 of the adhesive sheet 13, the perforation processing was performed to perforate at least one of a plurality of squares 17. During this perforation processing, positions and a number of squares 17 to be perforated in each virtual perforation region 15 were individually set in accordance with the position of the outermost circumferential cell 9d to which each virtual perforation region 15 corresponded. Specifically, as shown in FIG. 5 to FIG. 7, the positions and the number of squares 17 to be perforated were set so that a hole 19 formed by perforation was present only in an open range of the outermost circumferential cell 9d to be plugged and was not present in an open range of another adjacent cell or on an outer side of a circumferential wall 6. After the perforation processing, the end portion of the honeycomb structure, in which the adhesive sheet was attached to the end face, was immersed into a plugging slurry (a slurried material of the same material as in the honeycomb structure), and end portions of the cells to be plugged were charged with the plugging slurry through the holes formed in the sheet by the perforation processing to form plugging portions. Afterward, it was checked whether or not the plugging slurry adhered to an inner peripheral surface of the other cell adjacent to the outermost circumferential cell to be plugged and the circumferential wall of the honeycomb structure, and Table 1 shows the result.

Example 2

The procedure of Example 1 was repeated to perform recognition of positions of usual cells and outermost circumferential cells, perforation processing to a sheet and formation of plugging portions, except that a honeycomb structure of a different structure was used. Afterward, it was checked whether or not a plugging slurry adhered to an inner peripheral surface of another cell adjacent to the outermost circumferential cell to be plugged and a circumferential wall of the honeycomb structure, and Table 1 shows the result. Additionally, in the honeycomb structure, there was used a honeycomb structure in which a length was 300 mm, an outer diameter was 300 mm, a partition wall thickness was 300 μm, a cell shape (a shape of the usual cell) was square, a cell density was 200 cpsi (31 cells/cm$^2$), and a designed cell pitch was 1.8 mm.

Example 3

The procedure of Example 1 was repeated to perform recognition of positions of usual cells and outermost circumferential cells, perforation processing to a sheet and formation of plugging portions, except that a honeycomb structure of a different structure was used. Afterward, it was checked whether or not a plugging slurry adhered to an inner peripheral surface of another cell adjacent to the outermost circumferential cell to be plugged and a circumferential wall of the honeycomb structure, and Table 1 shows the result.

Additionally, in the honeycomb structure, there was used a honeycomb structure in which a length was 230 mm, an outer diameter was 230 mm, a partition wall thickness was 300 μm, a cell shape (a shape of the usual cell) was square, a cell density was 100 cpsi (15.5 cells/cm²), and a designed cell pitch was 2.5 mm.

Comparative Example 1

Figure 9:
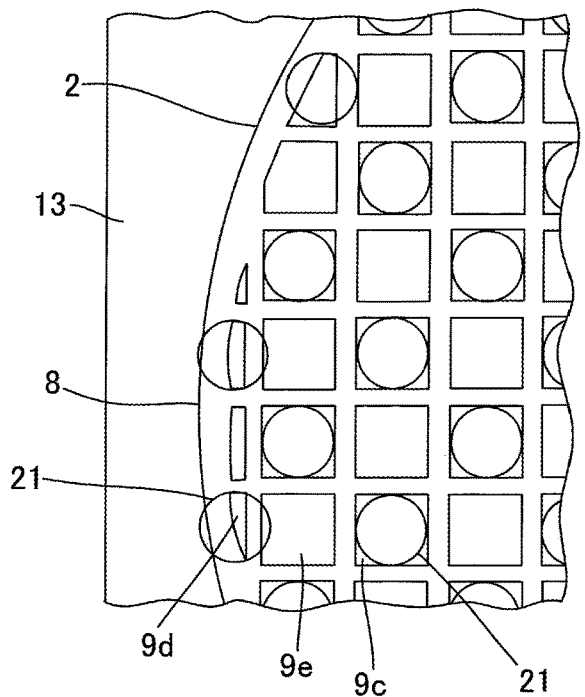
FIG. 9 is a schematic plan view to explain a method of perforation processing in Comparative Example 1.

A commercially available transparent adhesive sheet was attached to an end face of a honeycomb structure of the same structure as in the honeycomb structure used in Example 1. Afterward, the end face was imaged with a CCD camera, to subject an obtained image to image processing (binarization processing), and in a case where a black image of one block in the processed image reached 3% or more of a cell area of predetermined design, the image was regarded as a cell, to recognize its position. Additionally, an image resolution of the image processing was set to 0.06 mm/pixel. After recognizing the positions of the cells in the end face of the honeycomb structure in this manner, an XYZθ stage on which the honeycomb structure was mounted was positioned on the basis of the recognized positions, and positions on the adhesive sheet which corresponded to the cells to be plugged were irradiated with laser to perform perforation processing. The cells to be plugged were alternately present in the cell arranging direction so that the plugged end face had a checkerboard pattern. As shown in FIG. 9, the perforation processing at positions on an adhesive sheet 13 which corresponded to the cells to be plugged was performed by forming holes 21 of the same shape one by one at the respective positions irrespective of whether the cell to be plugged was a usual cell 9c or an outermost circumferential cell 9d. After the perforation processing, an end portion of the honeycomb structure, in which the adhesive sheet was attached to the end face, was immersed into a plugging slurry (a slurried material of the same material as in the honeycomb structure), and end portions of the cells to be plugged were charged with the plugging slurry through the holes formed in the sheet by the perforation processing to form plugging portions. Afterward, it was checked whether or not the plugging slurry adhered to an inner peripheral surface of another cell adjacent to the outermost circumferential cell to be plugged and a circumferential wall of the honeycomb structure, and Table 1 shows the result.

Comparative Example 2

Figure 10:
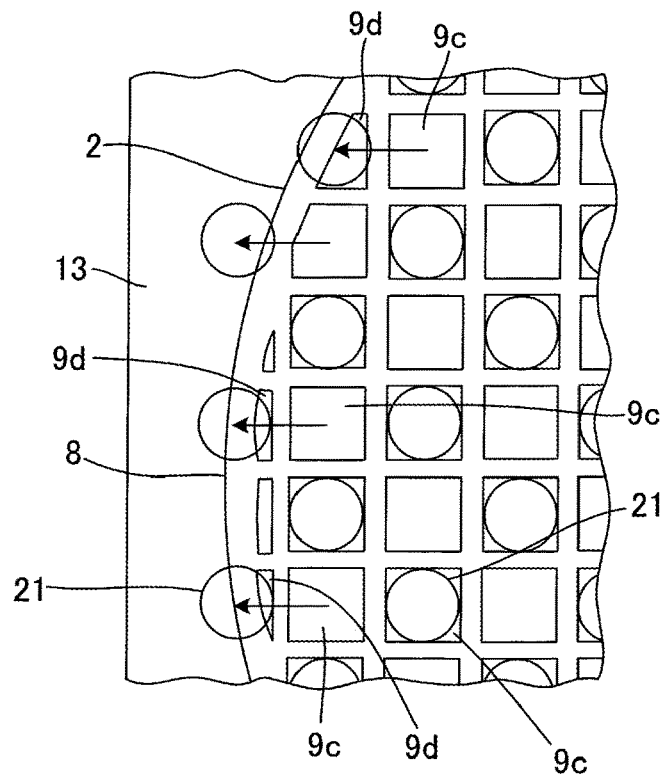
FIG. 10 is a schematic plan view to explain a method of perforation processing in Comparative Example 2.

A commercially available transparent adhesive sheet was attached to an end face of a honeycomb structure of the same structure as in the honeycomb structure used in Example 1. Afterward, the end face was imaged with a CCD camera, to subject an obtained image to image processing (binarization processing), and in a case where a black image of one block in the processed image reached 80% or more of a cell area of predetermined design, the image was regarded as a usual cell, to recognize its position. Additionally, an image resolution of the image processing was set to 0.06 mm/pixel. Furthermore, an average cell pitch was calculated from the usual cells whose positions were recognized in this manner. Further, as shown in FIG. 10, a position moved from a cell present on the most circumferential side in usual cells 9c as much as the average cell pitch on a circumferential side of a honeycomb structure 2 in a cell arranging direction was recognized as a position of an outermost circumferential cell 9d. It is to be noted that in Comparative Example 2, the position of the outermost circumferential cell is calculated and recognized only from the average cell pitch of the usual cells, and it is not taken into consideration whether or not the position moved as much as the average cell pitch as described above is on an inner side from a circumference of the end face of the honeycomb structure. After recognizing the positions of the usual cells and the outermost circumferential cells in the end face of the honeycomb structure in this manner, an XYZθ stage on which the honeycomb structure was mounted was positioned on the basis of the recognized positions, and positions on the adhesive sheet which corresponded to the cells to be plugged were irradiated with laser to perform perforation processing. The cells to be plugged were alternately present in the cell arranging direction so that the plugged end face had a checkerboard pattern. As shown in FIG. 10, the perforation processing at positions on an adhesive sheet 13 which corresponded to the cells to be plugged was performed by forming holes 21 of the same shape one by one at the respective positions irrespective of whether the cell to be plugged was the usual cell 9c or the outermost circumferential cell 9d. It is to be noted that as described above, in Comparative Example 2, when recognizing the position of the outermost circumferential cell, it is not taken into consideration whether or not the position moved as much as the average cell pitch as described above is present on the inner side from the circumference of the end face of the honeycomb structure. Consequently, even when the position moved as much as the average cell pitch as described above is a position on an outer side from the circumference of the end face of the honeycomb structure, the hole is formed at the position. After the perforation processing, an end portion of the honeycomb structure, in which the adhesive sheet was attached to the end face, was immersed into a plugging slurry (a slurried material of the same material as in the honeycomb structure), and end portions of the cells to be plugged were charged with the plugging slurry through the holes formed in the sheet by the perforation processing to form plugging portions. Afterward, it was checked whether or not the plugging slurry adhered to an inner peripheral surface of another cell adjacent to the outermost circumferential cell to be plugged and a circumferential wall of the honeycomb structure, and Table 1 shows the result.

TABLE 1

| | Presence/absence of adhesion of plugging slurry to inner peripheral surface of another cell adjacent to outermost circumferential cell to be plugged *1 | Presence/absence of adhesion of plugging slurry to circumferential wall of honeycomb structure *2 |
| --- | --- | --- |
| Example 1 | None | None |
| Example 2 | None | None |
| Example 3 | None | None |
| Comparative Example 1 | Present | Present |
| Comparative Example 2 | None | Present |

*1: For all the other cells which were adjacent to the outermost circumferential cells to be plugged and which were not to be plugged, it was checked whether or not the plugging slurry adhered to inner peripheral surfaces of the cells, and in a case where there was even one cell in which the plugging slurry adhered to the inner peripheral surface, "present" is shown, and in a case where there were not any such cells, "none" is shown.
*2: It was checked whether or not the plugging slurry adhered along the whole circumferential surface of the circumferential wall of the honeycomb structure, and in a case where there was even one region to which the plugging slurry adhered, "present" is shown, and in a case where there were not any such regions, "none" is shown.

As shown in Table 1, in Examples 1 to 3 which are examples of the present invention, the plugging slurry did not adhered at all to the inner peripheral surfaces of the other cells adjacent to the outermost circumferential cells to be plugged and the circumferential wall of the honeycomb structure. This is because as shown in FIG. 5 to FIG. 7, all the holes 19 formed in the squares 17 of the virtual perforation region 15 disposed at the position on the adhesive sheet which corresponds to the outermost circumferential cell 9d to be plugged are present only in the open range of the outermost circumferential cell 9d to be plugged. That is, in such a perforation state, when forming the plugging portion in the outermost circumferential cell of the honeycomb structure, the outermost circumferential cell to be plugged is securely charged with the plugging slurry passing through the hole formed in the adhesive sheet, and the plugging slurry does not leak out from the outermost circumferential cell to be plugged.

Figure 11:
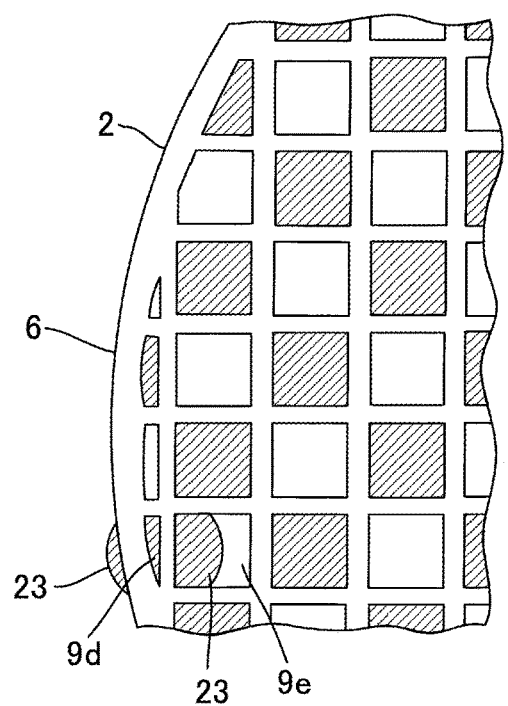
FIG. 11 is a schematic plan view showing a state after formation of plugging portions in Comparative Example 1.

On the other hand, in Comparative Example 1, as shown in FIG. 11, it was confirmed that a plugging slurry 23 adhered to an inner peripheral surface of another cell 9e adjacent to an outermost circumferential cell 9d to be plugged and a circumferential wall 6 of a honeycomb structure 2. This is because as shown in FIG. 9, the hole 21 formed at the position on the adhesive sheet 13 which corresponds to the outermost circumferential cell 9d to be plugged does not fall in the open range of the outermost circumferential cell 9d and reaches an outer side from the adjacent other cell 9e and the circumference of the honeycomb structure 2. That is, in such a perforation state, when forming the plugging portions, in addition that the outermost circumferential cells to be plugged are charged with the plugging slurry passing through the holes formed in the adhesive sheet, the plugging slurry leaks out from the other cells adjacent to the outermost circumferential cells or the circumference of the honeycomb structure.

Figure 12:
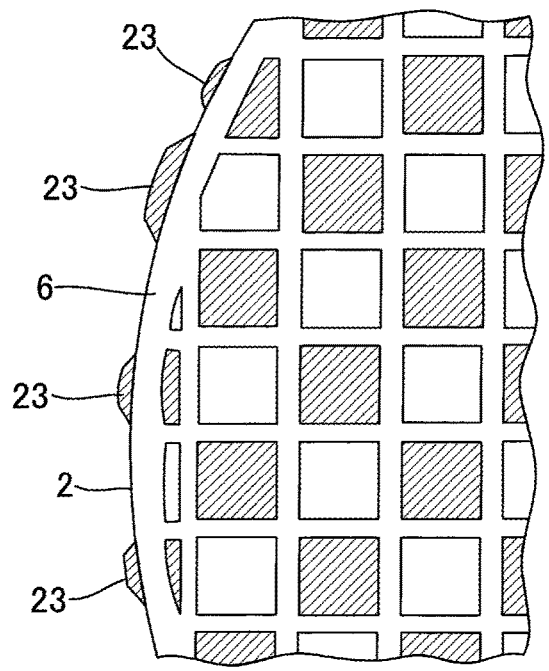
FIG. 12 is a schematic plan view showing a state after formation of plugging portions in Comparative Example 2.

Furthermore, in Comparative Example 2, it was confirmed that a plugging slurry 23 adhered to a circumferential wall 6 of a honeycomb structure 2 as shown in FIG. 12. This is because, as shown in FIG. 10, a part of the hole 21 formed at the position on the adhesive sheet 13 which corresponded to the outermost circumferential cell 9d to be plugged was present on the outer side from the circumference 8 of the end face of the honeycomb structure 2. That is, in such a perforation state, when forming the plugging portions, the plugging slurry passing through the holes formed in the adhesive sheet leaks out from the circumference of the honeycomb structure.

INDUSTRIAL APPLICABILITY

The present invention is suitably utilizable as a method for producing a plugged honeycomb structure for use in a filter such as a DPF.

DESCRIPTION OF REFERENCE NUMERALS

1: plugged honeycomb structure, 2: honeycomb structure, 3: end face, 5: end face, 6: circumferential wall, 7: partition wall, 8: circumference, 9: cell, 9a: cell, 9b: cell, 9c: usual cell, 9d: outermost circumferential cell, 9e: cell adjacent to the outermost circumferential cell, 11: plugging portion, 13: sheet, 15: virtual perforation region, 17: square, 19: hole, 21: hole, and 23: plugging slurry.

The invention claimed is:

1. A method for producing a plugged honeycomb structure including a honeycomb structure in which a porous partition wall defines and forms a plurality of cells communicating between two end faces of the honeycomb structure, and plugging portions which are arranged to plug one of two open ends of each of the plurality of cells, the plurality of cells being constituted of outermost circumferential cells positioned in an outermost circumferential portion of the honeycomb structure, and usual cells other than the outermost circumferential cells, the method comprising:
    attaching a transparent sheet to an end face of the honeycomb structure;
    imaging the end face;
    performing image processing of an image obtained by imaging the end face to recognize positions of the usual cells;
    performing perforation processing, on the basis of the recognition of the positions of the usual cells, at the positions on the sheet which correspond to the usual cells to be plugged;
    recognizing, as positions of the outermost circumferential cells, positions each of which is calculated from an average cell pitch of the usual cells whose positions are recognized by the image processing, each of the positions calculated from the average cell pitch being present on an inner side from a circumference of the end face of the honeycomb structure;
    disposing, on the basis of the recognition of the positions of the outermost circumferential cells, virtual perforation regions at positions on the sheet which correspond to the outermost circumferential cells to be plugged, each of the virtual perforation regions being divided into a plurality of squares;
    performing perforation processing of perforating at least one of the plurality of squares in each of the virtual perforation regions, the perforation processing including individually setting positions and a number of squares to be perforated in each of the virtual perforation regions in accordance with each of the positions of the outermost circumferential cells to be plugged to which each of the virtual perforation regions corresponds;
    immersing an end portion of the honeycomb structure into a plugging slurry in which a material of the plugging portions is slurried, after the perforation processing at the positions corresponding to the usual cells and in each of the virtual perforation regions; and
    forming the plugging portions by charging end portions of the plurality of cells to be plugged with the plugging slurry through holes formed in the sheet by the perforation processing at the positions corresponding to the usual cells and in each of the virtual perforation regions.

2. The method for producing the plugged honeycomb structure according to claim 1,
    wherein the positions and the number of squares to be perforated in each of the virtual perforation regions are set so that a hole made by perforation is present only in an open range of each of the outermost circumferential cells to be plugged.

3. The method for producing the plugged honeycomb structure according to claim 2,
    wherein the perforation processing at the positions corresponding to the usual cells and in each of the virtual perforation regions is carried out by using laser.

4. The method for producing the plugged honeycomb structure according to claim 1,
    wherein the perforation processing at the positions corresponding to the usual cells and in each of the virtual perforation regions is carried out by using laser.

* * * * *